US011748557B2

(12) United States Patent
Chua et al.

(10) Patent No.: US 11,748,557 B2
(45) Date of Patent: *Sep. 5, 2023

(54) PERSONALIZATION OF CONTENT SUGGESTIONS FOR DOCUMENT CREATION

(71) Applicant: Microsoft Technology Licensing, LLC, Redmond, WA (US)

(72) Inventors: Marian Kimberley Chua, Bellevue, WA (US); Michael Schreiber, Seattle, WA (US); Christopher Andrews Jung, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/476,539

(22) Filed: Sep. 16, 2021

(65) Prior Publication Data

US 2022/0004705 A1 Jan. 6, 2022

Related U.S. Application Data

(63) Continuation of application No. 16/145,506, filed on Sep. 28, 2018, now Pat. No. 11,151,313.

(51) Int. Cl.
*G06F 40/186* (2020.01)
*G06F 16/335* (2019.01)
(Continued)

(52) U.S. Cl.
CPC .......... *G06F 40/186* (2020.01); *G06F 16/337* (2019.01); *G06F 16/93* (2019.01); *G06N 20/00* (2019.01)

(58) Field of Classification Search
None
See application file for complete search history.

(56) References Cited

U.S. PATENT DOCUMENTS 8,990,672 B1 * 3/2015 Grosz ................. G06F 40/186
715/202
10,970,656 B2 * 4/2021 Newhouse ......... G06Q 10/0631
(Continued)

OTHER PUBLICATIONS

V. Bellandi, P. Ceravolo, F. Frati, J. Maggesi, G. Waldhart and I. Seeber, "Design principles for competence-based Recommender Systems," 2012 6th IEEE International Conference on Digital Ecosystems and Technologies (DEST), Campione d'Italia, Italy, 2012, pp. 1-6 (Year: 2012).*

(Continued)

*Primary Examiner* — Ariel Mercado
*Assistant Examiner* — Ariel Mercado Vargas

(57) ABSTRACT

The present disclosure relates to processing operations that generate and present personalized content suggestions to assist a user with document creation. Machine learning modeling may be trained and implemented to evolve pre-canned suggestions for document creation into highly personalized content suggestions, thereby improving the document creation process and user interface experience for users of applications/services that are utilized to create digital documents. As an example, signal data may be detected and analyzed, identifying a specific user's intent to create a digital document. Machine learning modeling may be implemented to evaluate different aspects of collected signal data and identify content from previously created documents, associated with a user account, that may be most relevant to the real-time document creation experience of the user. Personalized contextual suggestions may be presented to a user through a user interface. Examples described herein
(Continued)

may be extensible across any type of application/service configured for document creation.

20 Claims, 9 Drawing Sheets

(51) Int. Cl.
*G06F 16/93* (2019.01)
*G06N 20/00* (2019.01)

(56) References Cited

U.S. PATENT DOCUMENTS

2017/0344656 A1* 11/2017 Koren .................. G06F 3/0484
2018/0300324 A1* 10/2018 Ziraknejad ............. G06N 20/00
2020/0074310 A1* 3/2020 Li ......................... G06Q 40/12

OTHER PUBLICATIONS

S. Jayarathna and F. Shipman, "Analysis and Modeling of Unified User Interest," 2017 IEEE International Conference on Information Reuse and Integration (IRI), San Diego, CA, USA, 2017, pp. 298-307. (Year: 2017).*

* cited by examiner

100

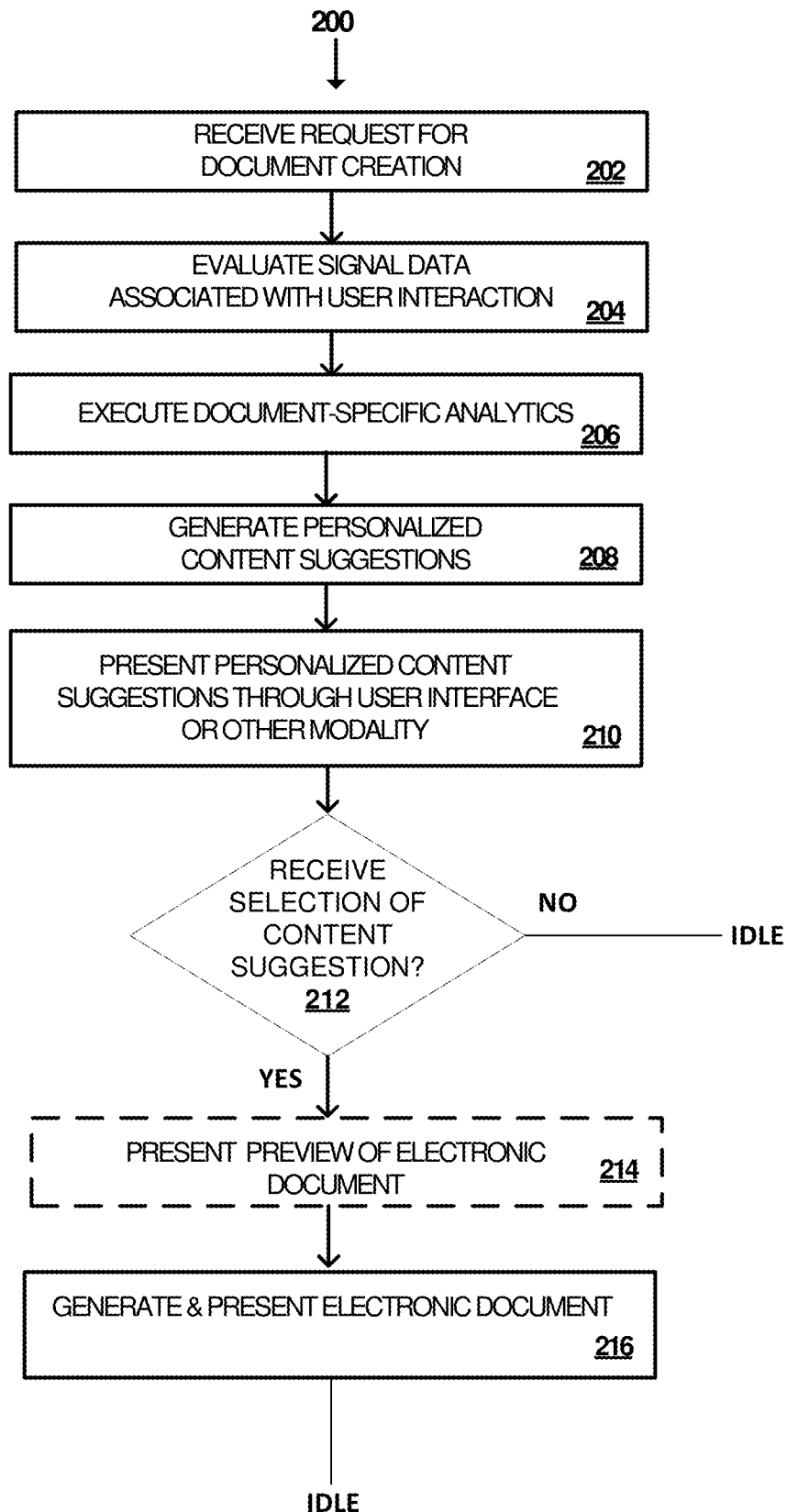

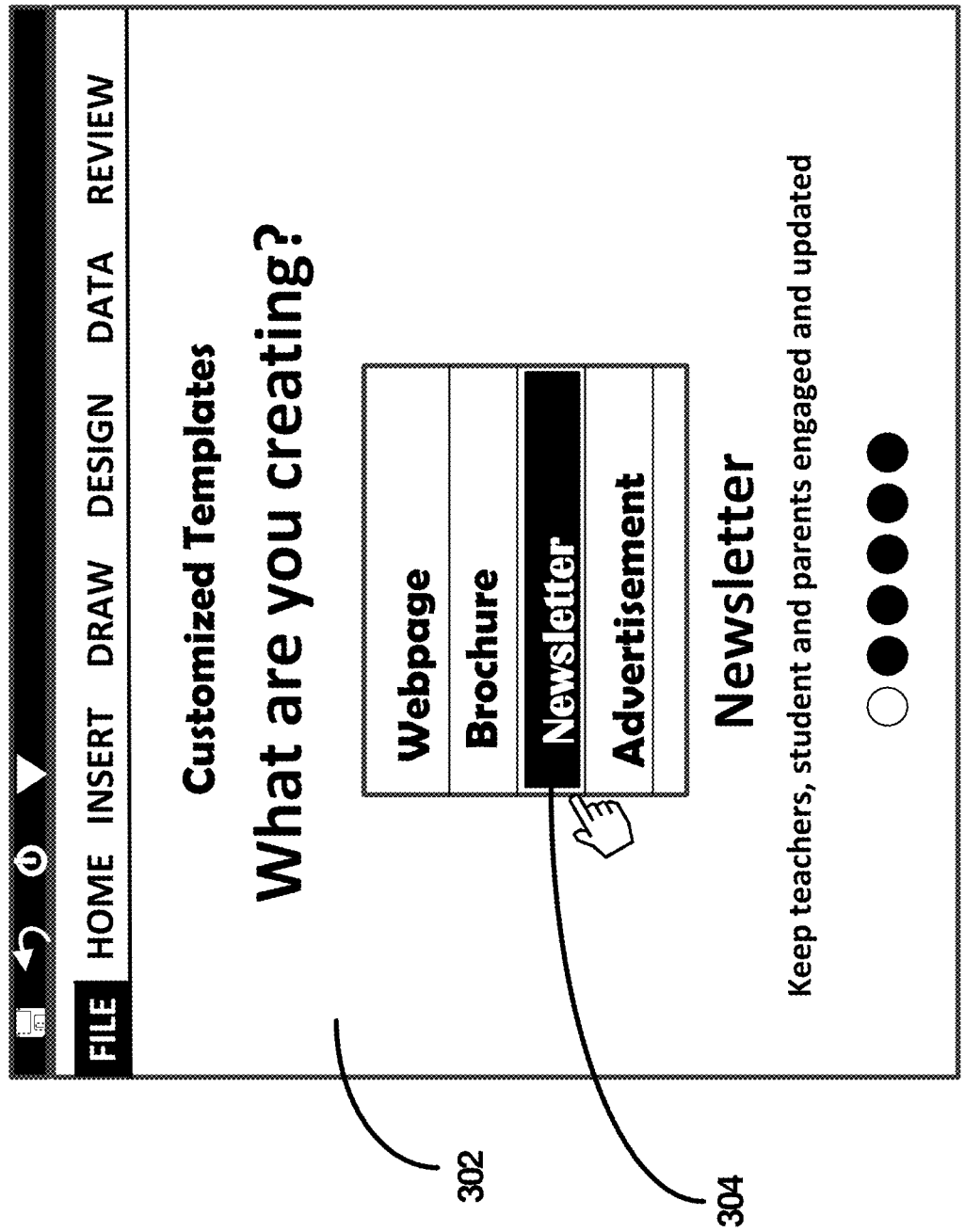

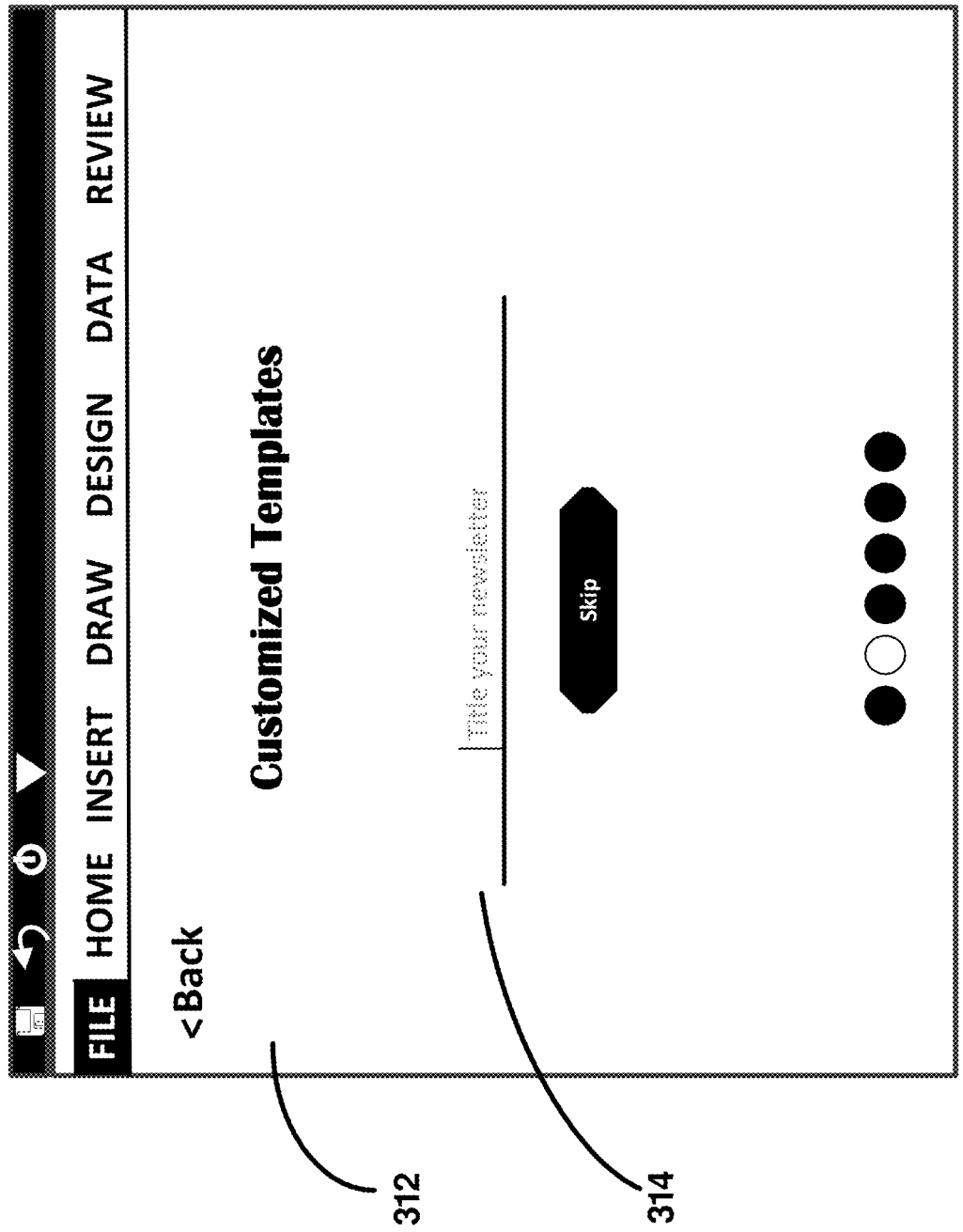

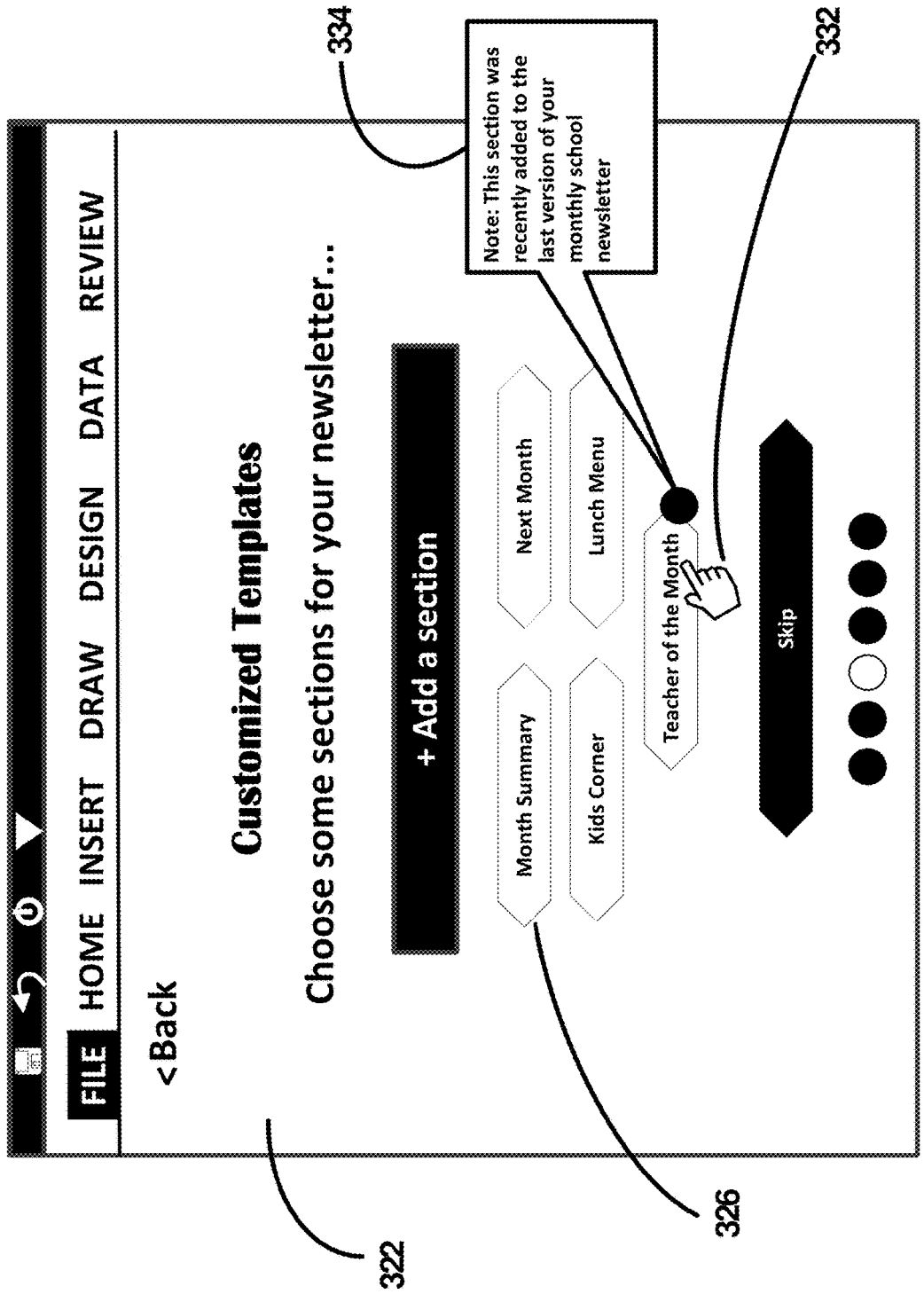

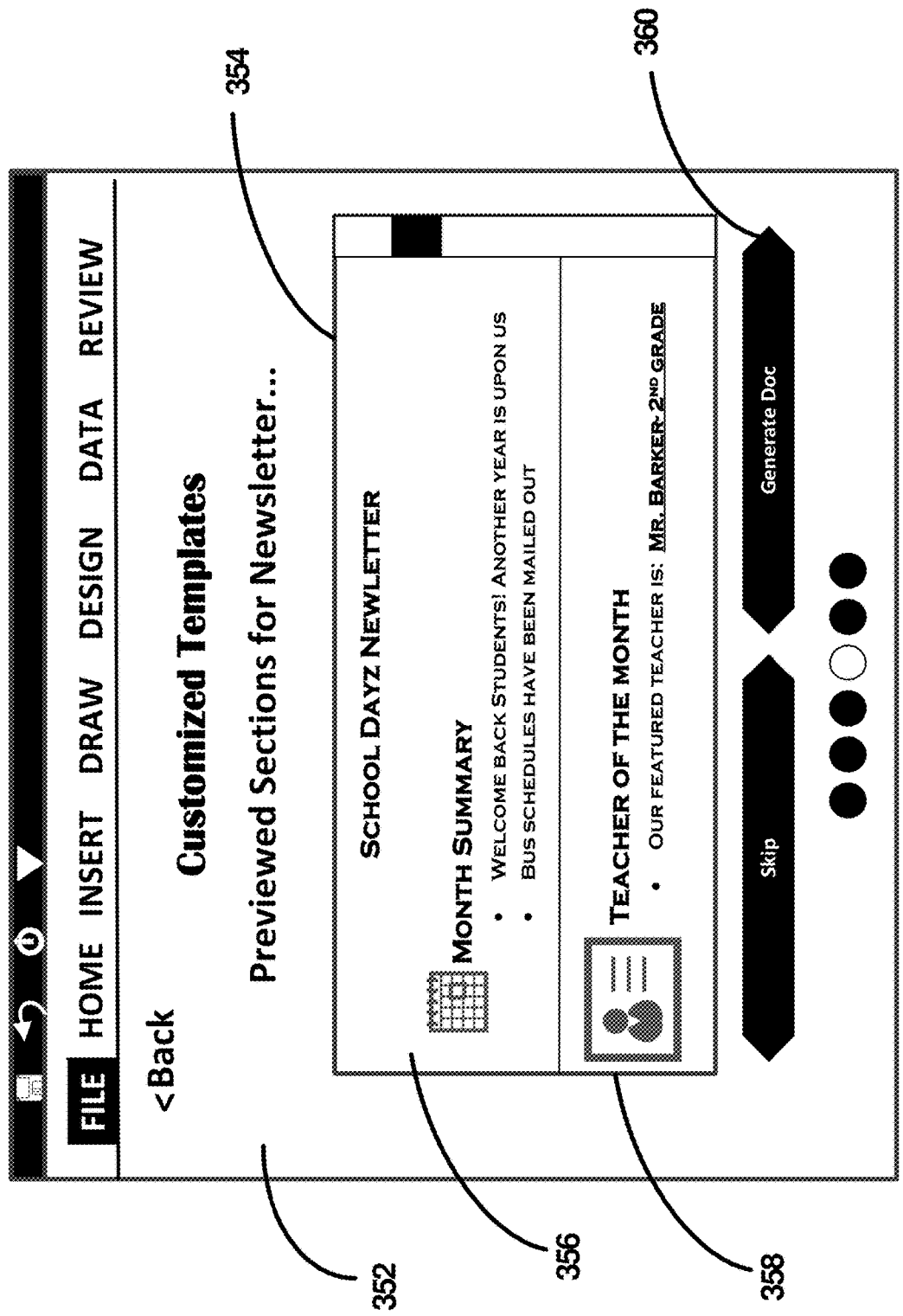

PERSONALIZATION OF CONTENT SUGGESTIONS FOR DOCUMENT CREATION

RELATED APPLICATIONS

This application is a continuation of and claims priority to U.S. patent application Ser. No. 16/145,506, entitled "Personalization of Content Suggestions for Document Creation" filed Sep. 28, 2018, now U.S. Pat. No. 11,151,313, issued Oct. 19, 2021, the disclosure of which is hereby incorporated by reference herein in its entirety.

BACKGROUND

Document creation presents challenges to users. In some instances, users create documents from scratch, where the user may begin document creation with a blank page. This may require the user to utilize a large amount of computing resources to generate content to fill in their document. In addition to tying up computing resources, starting from scratch can be overwhelming to a user (e.g., "blank page syndrome") effectively limiting user efficiency as well as increasing latency during document creation. As an alternative to starting from scratch, many applications/services provide basic templates for document creation. However, users tend to shy away from using such templates because such templates include pre-canned content that is irrelevant to the user, making it inefficient to create a template that includes such content. Furthermore, it is tedious for the user to personalize such a template, requiring numerous processing operations (e.g., deleting content) to get the template in a state where the user can proceed with personalizing the template. For instance, users may feel locked into the structure/content/style of the template, where numerous processing operations are required to deleting pre-populated content that a user does not want. Afterwards, a user still needs to add its content for customized document creation. As such, using pre-canned templates can be both inefficient and frustrating for a user.

Additionally, users may struggle a lack of familiarity with features and user interfaces associated with applications/services that are used to create documents. This may further lead to inefficient processing efficiency during document creation as well as compound frustration for users. In other instances, users may be working across a number of different devices, where different applications/services present different user interface experiences across such different devices. This may make it more difficult for creating documents from scratch or modifying pre-canned templates, for example, where a mobile version of an application/service may have a different user interface (and associated features) from that of a full version of an application/service.

SUMMARY

In view of the foregoing technical challenges, the present disclosure relates to processing operations that generate and present personalized content suggestions to assist a user with document creation. Machine learning modeling may be trained and implemented to evolve pre-canned suggestions for document creation into highly personalized content suggestions, thereby improving the document creation process and user interface experience for users of applications/services that are utilized to create electronic documents. As an example, signal data may be detected and analyzed, identifying a specific user's intent to create an electronic document. Machine learning modeling may be implemented to evaluate different aspects of collected signal data and identify content from previously created documents, associated with a user account, that may be most relevant to the real-time document creation experience of the user. Personalized contextual suggestions may be presented to a user through a user interface. Concepts of the present disclosure may be applied to applications/services in the mobile authoring space as well as more broadly to other form factors across a wide variety of applications/services. In one non-limiting implementation example, processing operations described herein may be implemented as a microservice that can be reused by different applications/services and adapted to application-specific scenarios.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 2 illustrates an exemplary method related to provision of personalized content suggestions, with which aspects of the present disclosure may be practiced.

FIGS. 3A-3F illustrate exemplary processing device views associated with provision of personalized content suggestions through a user interface, with which aspects of the present disclosure may be practiced.

DETAILED DESCRIPTION

Figure 1:
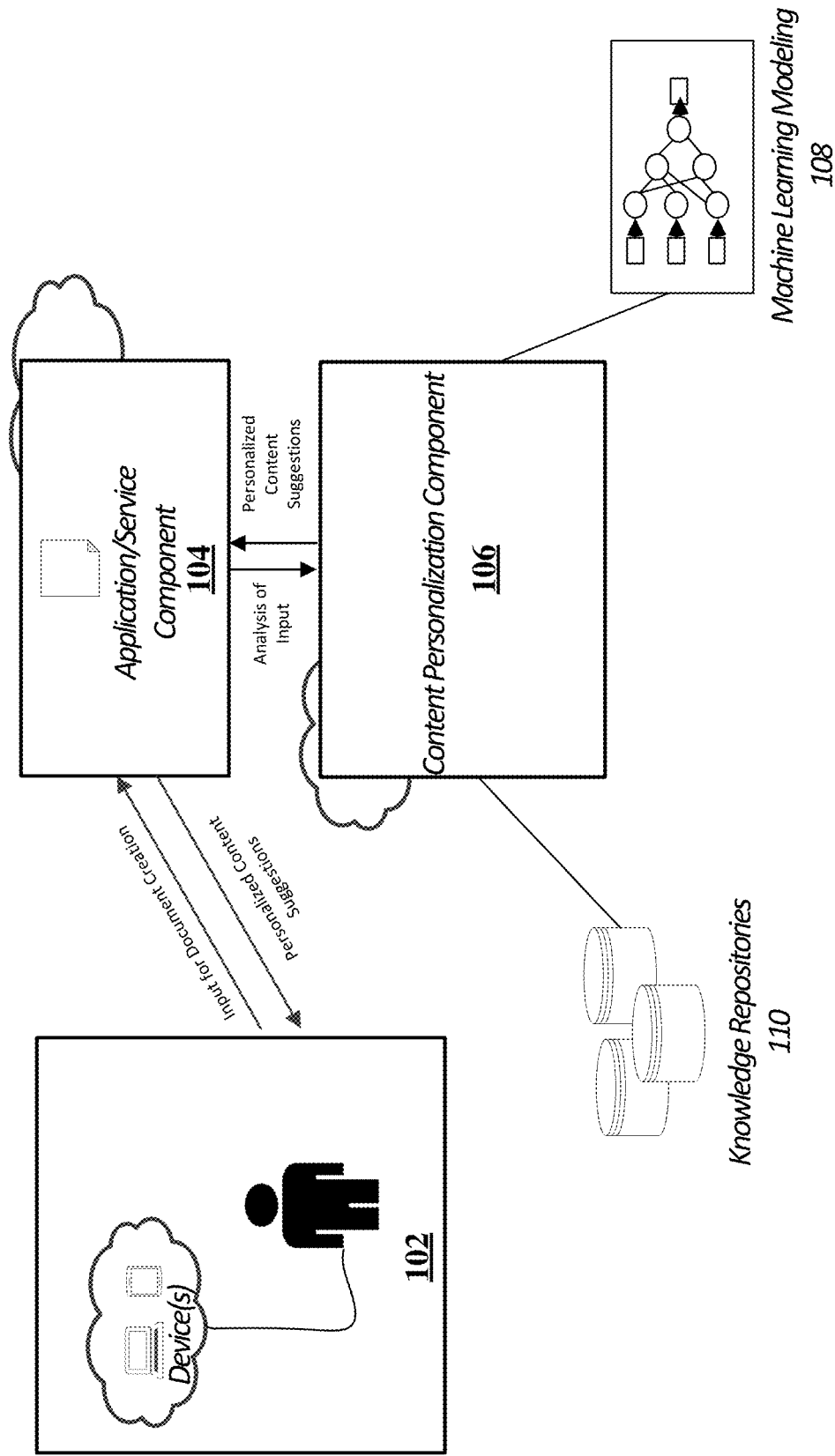
FIG. 1 illustrates an exemplary process flow providing exemplary components for presentation of personalized content suggestions, with which aspects of the present disclosure may be practiced.

The present disclosure relates to processing operations that generate and present personalized content suggestions to assist a user with document creation. Machine learning modeling may be trained and implemented to evolve pre-canned suggestions for document creation into highly personalized content suggestions, thereby improving the document creation process and user interface experience for users of applications/services that are utilized to create electronic documents. As an example, signal data may be detected and analyzed, identifying a specific user's intent to create an electronic document. Machine learning modeling may be implemented to evaluate different aspects of collected signal data and identify content from previously created documents, associated with a user account, that may be most relevant to the real-time document creation experience of the user. Personalized contextual suggestions may be presented to a user through a user interface, where a user interface of an application/service is adapted to provide functionality described herein.

In implementation of trained machine learning modeling, document-specific analytics are executed to match previously created documents with a document type that matches a user's intent for document creation. Execution of document-specific analytics enables improved efficiency and enhance productivity to assist users with recreating documents that they regularly work with. For instance, personalized content suggestions may be generated and presented, through a user interface, for a specific document type that enables efficient recreation of content for that document type. This may comprise content that a user (or associated group of users) has worked with in the past. As an example, a user may create a monthly newsletter for a school or business, that regularly uses the same custom created content sections. Such content sections are not available in traditional document creation templates. Moreover, examples described herein avoid requiring users to have access (direct or indirect) to previous versions of electronic documents. Previous versions of an electronic document may not be readily on-hand for users or easily accessible, for example, in instances where a specific user is not the creator of an electronic document.

As indicated in the foregoing, processing operations described herein are configured to adapt an application/service to fit a context that a specific user may be working with. If the user's intent changes, the machine learning modeling is configured to adapt in real-time to tailor personalized content suggestions for a specific user during creation of a specific document type. As such, unique user experiences are created where one users experience may differ from that of another. Examples describe herein are applicable in scenarios where a user is creating an electronic document from scratch, as well as those in which a user is working with an existing electronic document. Processing operations described herein may be useful to adding content as well as modifying structure and layout of an electronic document. Real-time (or near real-time) processing enables application/services to continuously provide tailored user experiences, where user interfaces may be adapted to reflect a context that a specific user is working with. Processing device views that illustrate non-limiting user interface examples of the present disclosure are provided in FIGS. 3A-3F.

In one instance, processing operations described herein may be programmed to execute within the coding of an application/service. In another example, processing operations of the present disclosure may be executed by a stand-alone application/service that is configured to interface with a plurality of applications/services to provide customized application experiences. For example, an application/service for management of personalized content suggestions may interface with an application platform providing a suite of productivity applications/services, where personalized content suggestions can be tailored to the specific types of electronic documents that individual applications/services are programmed to work with. In one non-limiting implementation example of a stand-alone application/service for personalized content management, processing operations described herein may be implemented as a microservice that can be reused by different applications/services and adapted to application-specific scenarios. In such an example, an example micro-service may interface with other applications/service through an application programming interface (API). The microservice provides a lightweight service-oriented architecture that enables content suggestion management to be developed, deployed and scaled across different types of applications/services. Insights for customization of personalized content suggestions may be programmed through a microservice that is exposed to other applications/services, thereby enabling efficient future scaling where code of specific applications/services does not need to be altered to implement an updated software solution. Implementation of a microservice is known to one skilled in the field of art, where operation of an example microservice may be adapted to provide functionality as described in the present disclosure.

Exemplary technical advantages provided by processing described in the present disclosure including but are not limited to: enhancement of processing efficiency during digital document creation in real-time (or near real-time); improved processing efficiency (e.g., reduction in processing cycles, saving resources/bandwidth) for computing devices utilized for document creation; adapting and improving front-end user interfaces that are utilized to create electronic documents; generation and curation of personalized content suggestions for different users in different document creation scenarios; extensibility to tailor processing operations described herein across a plurality of different applications/services including implementing a micro-service configured for improving efficiency and operation of applications/services and associated computing devices; reduction in latency in generating user-specific templates, outlines, electronic documents, etc.; ability to process signal data in real-time to created tailored and personalized user experiences; and improving usability of applications/services, among other technical advantages.

FIG. 1 illustrates an exemplary process flow 100 providing exemplary components for presentation of personalized content suggestions, with which aspects of the present disclosure may be practiced. As an example, components of process flow 100 may be executed by an exemplary computing system (or computing systems) as described in the description of FIG. 4. Exemplary components, described in process flow 100, may be hardware and/or software components, which are programmed to execute processing operations described herein. In one example, components of process flow 100 may each be one or more computing devices associated with execution of a specific service. Exemplary services may be managed by an application platform that also provides, to a component, access to and knowledge of other components that are associated with applications/services. In one instance, processing operations described in process flow 100 may be implemented by one or more components connected over a distributed network. Operations performed in process flow 100 may correspond to operations executed by a system and/or service that execute computer programs, application programming interfaces (APIs), neural networks or machine-learning processing, language understanding processing, search and filtering processing, and generation of content for presentation through a user interface of an application/service, among other examples. In the illustration of process flow 100, there are process flow steps that are aimed at emphasizing non-limiting examples of interaction between components shown in FIG. 1. Process flow between components may be altered without departing from the spirit of the present disclosure.

Process flow 100 comprises user computing device(s) 102 (e.g., client computing device). An example of a user computing device 102 is a computing system (or computing systems) as described in the description of FIG. 4. A user may interact with an exemplary application/service through the user computing device(s) 102. For instance, the user may connect to an application/service through any number of different device modalities. In some examples, a user may connect to an application/service (e.g., a productivity application/service that is utilized to create or modify an electronic document) through different user computing devices 102, where non-limiting examples of such are: a smart phone, a laptop, a tablet, a desktop computer, etc. In other instances, a user may carry on a multi-modal communication with an application/service via multiple user computing devices.

A user may be accessing, through interfacing between a computing device 102 and an application/service component 104, one or more application/services that are used for document creation. An application/service that the user is accessing is configured to provide a user interface that enables document creation and modification. An example user interface may be adapted to provide functionality described herein where user interface features and application command control is achieved to foster improved creation of electronic documents through new user interface features that are not present in traditional user interface systems. For instance, a user may make a request, through a user interface or graphical user interface (GUI) for creation of an electronic document. New user interface menus may be presented to a user that includes the presentation of personalized content suggestions to assist a user with creation of an electronic document. In some examples, an adapted user interface may also be configured to provide previews of customized templates for electronic document creation so that a user can visually understand how content (e.g., selected topics and sections) may appear in a generated version of an electronic document. Processing device views that illustrate non-limiting user interface examples of the present disclosure are provided in FIGS. 3A-3F.

An electronic document (or electronic file) is a representation of content in an electronic media/electronic format such as a digital file. Examples of electronic documents may vary where files may be created to work with any type of application/service. Types of electronic documents are known to one skilled in the field. For instance, an electronic document may be created for a word processing service or notetaking service, where the electronic document may comprise authored content. Electronic documents may be accessed natively, through applications stored on the user computing device. In alternate examples, electronic documents may be accessed over a network connection such as in the following non-limiting examples: an electronic document is a web page accessed through a web browser; and an electronic document a distributed copy of a file that is being accessed but is remotely stored on a data storage (e.g., distributed data storage) other than the computing device 102 that is being used to access content.

As referenced above, exemplary applications/services may interface with other components of process flow 100 to enhance processing efficiency and functionality as described herein. The application/service component 104 is configured to interface with other components of process flow 100 including computing device(s) 102 and the content personalization component 106. Applications/services may be any type of programmed software. An exemplary application/service is a productivity application/service that is configured for execution to enable users to complete tasks on a computing device, where exemplary productivity services may be configured for access to and creation of content including electronic documents. Examples of productivity services comprise but are not limited to: word processing applications/services, spreadsheet applications/services, notes/notetaking applications/services, authoring applications/services, digital presentation applications/services, search engine applications/services, email applications/services, messaging applications/services, web browsing applications/services, collaborative team applications/services, digital assistant applications/services, webpage building applications/service, directory applications/services, mapping services, calendaring services, electronic payment services, digital data storage or distributed data storage applications/services, web conferencing applications/services, call communication applications/services, language understanding applications/services, bot framework applications/services, networking applications/service, and social networking applications/services, among other examples. In some examples, an exemplary productivity application/service may be a component of a suite of productivity applications/services that may be configured to interface with other applications/services associated with an application platform. For example, a word processing service may be included in a bundled service (e.g. Microsoft® Office365® or the like). Further, an exemplary productivity service may be configured to interface with other internet sources/services including third-party application/services, for example, to enhance functionality of productivity services during execution of operations such as: creation of electronic documents; retrieving file content, accessing file content, updating file content, validating content and storing content, among other examples.

As referenced in the foregoing, the application/service component 104 is configured to interface with the content personalization component 106. In doing so, signal data may be collected by either: the application/service component 104; or the content personalization component 106 via the application/service component 104, to enable contextual processing for user interaction within an application/service. Signal data may correspond to input received through an application/service and/or computing device(s) 102. In one example, input may correlate with a request for document creation of an electronic document by a user account. In one example, the input may be received through a user interface of an application/service via computing device(s) 102. Signal data associated with the input may be analyzed to evaluate a user intent for document creation, which may assist with generation of personalized content suggestions. User intent determinations may comprise identification of a document type that a user wishes to create, where user-specific signal data (associated with a user account) and application-specific signal data (e.g., user interaction through user interface of application/service) may be evaluated to determine user intent. While some examples relate to instances where a user is actively making a request for document creation, examples of the present disclosure are not so limited.

Processing operations described herein are further applicable to instances where user intent determinations are made predictively such as instances where a user account has accessed an application/service at a similar time frame to past detected user activity (e.g., a similar time each month where a user creates a specific type of electronic document). In some instances, signal data evaluation may be specific to past usage patterns of a user account with respect to interaction with an application/service. In such instances, personalized content suggestions may be relevant to the user even when the user has not initiated a document creation attempt but likely may intend to. Analysis of signal data may further be updated in real-time (or near real-time) as the user interactions with a user interface of an application/service.

The application/service component 104 may be configured to implement data modeling (e.g., machine learning modeling) to generate probabilistic determinations as to user intent, which may aid subsequent machine learning modeling to generate and output personalized content suggestions. In one instance, the application/service component 104 is configured to interface with an application framework that implements input understanding analysis for user intent determinations. As an example, a machine-learning based service may be utilized to execute signal data analysis directly through an application/service or alternatively implement generated applications, bots, internet of things (IoT) devices, etc., that are configured to interface with applications/services to detect user intent for received input (and associated signal data). Exemplary signal data may be any type of signal data collected across any of: computing device(s) 102; applications/services (e.g., applications/services that are being accessed); and signal data associated with user accounts such as a user account making the request for document creation and/or user accounts that are affiliated with the user account making the request (e.g., user accounts in a same group, team, organization, social network), user access including devices and modalities of access to applications/services, among other examples. Non-limiting examples of signal data collected may comprise but are not limited to: a document type that is associated with a request for creation (e.g., selected document type); access to specific document types by user accounts; application/service usage (e.g., user usage patterns); textual or voice input received through an application/service; and user account identification, among other examples.

Input received through an application/service may be propagated to the content personalization component 106. The content personalization component 106 is configured generate personalized content suggestions to assist a user with document creation. In doing so, the content personalization component 106 interface with the application/service component 104 to receive analysis of user input (and associated signal data), whereby the content personalization component 106 applies machine learning modeling 108 to evaluate the received data and generate personalized content suggestions for a context in which a user is working with. The content personalization component 106 is configured to employ one or more components that are configured to implement machine learning modeling 108 to generate and select personalized content suggestions for output. Personalized content suggestions may be user-specific (e.g., associated with a specific user or group of users) that comprises topics, sections, content portions, etc., which are determined from previously created electronic documents. For instance, previously created electronic documents may be matched to a document type associated with a received request for document creation, user usage patterns, etc., where the previously created electronic documents comprise documents that the user, associated with the request for document creation. Documents associated with the user account may comprise: electronic documents created by the user account, electronic documents accessed by the user account, and/or electronic documents that or were created/accessed by other user accounts that are affiliated with the user account (e.g., user accounts in a same group, team, organization, social network).

While exemplary machine learning modeling 108 may be trained to execute document-specific analytics for previously created electronic documents, the content personalization component 106 may be further configured to utilize analysis of user input to retrieve content suggestions from other resources (e.g., other applications/services including third-party applications/services, web crawling, search results, entity-specific and other knowledge databases etc.) The content personalization component 106 interfaces with knowledge repositories 110 that comprise any type of resource connection via a network connection. Furthermore, knowledge repositories 110 comprise data storages that comprise the previously created electronic documents and/or log data that may be utilized to identify specific previously created electronic documents. Knowledge repositories 110 may comprise database access (e.g., distributed data storage) including any type of information accessible through an application platform and/or third-party applications/services. The content personalization component 106 is configured to enable interfacing between the knowledge repositories 110 and the machine learning modeling 108, which may execute machine learning processing to identify correlations between a user's current context and previously created electronic documents.

Creation, training and update of a machine learning modeling 108 is known to one skilled in the field of art. In the present examples, machine learning modeling 108 may be further customized to execute document-specific analytics for the correlation of the previously created electronic documents with a determined user intent. For implementation, the machine learning modeling 108 may be trained to correlate previously created documents with specific inputs (e.g., derived from analysis of input and associated signal data) as well as identify specific content portions of previously created electronic documents that may be most relevant for the user. For instance, a user may create a business report, on a monthly basis, where the business report is the same document type created each month. Machine learning modeling 108 may be configured to identify similar types of documents for a user as well as content portions from those documents that the user may find most useful in creation a new version of an electronic document. This may remove the need for the user to have direct access to older versions of electronic documents as well as remove the need for the user to create a document from a template where the user would have to remove numerous content portions that may be irrelevant to a specific type of document that the user works with.

As referenced in the foregoing, the content personalization component 106, in implementing machine learning modeling 108, executes document-specific analytics to correlate previously created electronic documents with a user intent for document creation (or a predicted user intent for document creation). In doing so, the content personalization component 106 is configured to match previously created electronic documents that are associated with the user account to the identified document type identified for the user intent. Previously created documents that match a document type associated with the user intent may be further analyzed to best identify relevant electronic documents for generation of the personalized content suggestions. For instance, content and metadata associated with specific electronic documents may be analyzed to identify insights that can be used to rank electronic documents for relevance to a user. Examples of insights that may be generated and evaluated comprise but are not limited to: keywords; specific content portions including identification of rich data objects; created topics and/or sections; usage patterns related to user interaction with documents created by the user or other user accounts; number of electronic documents created for a specific document type; collaborative access and usage on a group level; aggregation of telemetry data to specific levels (e.g., user, group, application/service) and time-specific usage relating to user access to specific electronic documents, among other examples. Further non-limiting examples of telemetric data may comprise user behavior analysis related to: amount of time spent by the user accessing an electronic document; distribution of an electronic document to other users; user patterns when accessing applications/services through specific modalities (e.g., mobile phone versus desktop computing device); content specific analytics (e.g., user focus on specific topics/sections of content); whether electronic documents were accessed or ignored when received from other user accounts; and user priority/importance rankings (e.g., within a team or organization, productivity analysis), among other examples.

The content personalization component 106 is further configured to generate personalized content suggestions based on the results from the execution of the document-specific analytics. In doing so, the content personalization component 106 may be configured to employ a ranker to execute ranking processing for evaluation of any number of the plurality of factors identified in the foregoing description. The ranker may be utilized to help identify most relevant electronic documents and specific content from those electronic documents, which can be utilized to generate the personalized content suggestions. Ranking processing, ranking methodologies (including classification and regression analysis) and implementation of an exemplary ranker is known to one skilled in the field of art. In further examples, developers may implement weighting to emphasize priority of specific insights over other insights, where developers can assign different weights to different insights.

Generation of personalized content suggestions may comprise extracting content portions from previously created electronic documents and/or creating a new representation (e.g., design, layout, presentation) of content portions identified from the previously created electronic documents. Rankings associated with generated personalized content suggestions may be used by the machine learning modeling to select personalized content suggestions for output. For example, one or more highest ranked of the personalized content suggestions may be selected for output. In further examples, the machine learning modeling may be trained to evaluate other types of factors in determining the number of personalized content suggestions to output. Examples of such factors include but are not limited to: the modality by which the user is accessing an application/service; available display space within an application/service based on the usage by the user; and threshold levels of ranking (e.g., a number of ranked suggestions that meet a threshold level of relevance), among other examples.

One or more personalized content suggestions, selected for output, may be propagated to the application/service component 104 for output through the user interface of an application/service. The personalized content suggestions may be presented, by the application/service component 104, on computing devices(s) 102 through the user interface of the application/service. Personalized content suggestions may be selected, through the user interface, where selection of the personalized content suggestions may be utilized for document creation. In one example, a user interface of an application/service may be adapted to enable generation of a preview of an electronic document that comprises one or more personalized content suggestions which are selected. This may provide a user with an opportunity to understand how the personalized content suggestions may appear in a generated electronic document. In another example, a user interface of an application/service may be adapted to generate an electronic document on behalf of the user based on selection of one or more of the personalized content suggestions. Thus, a generated electronic document may be tailored for the user so that the user does not need to work with a blank page or remove a large amount of unwanted content from a traditional document template.

In alternative examples, the personalized content suggestions may be presented to a user through other types of modalities rather than a user interface of an application/service. For instance, the application/service component 104 may be integrated within an application platform that has access to provide the personalized content suggestions through other modalities such as email, instant messaging, notifications, etc. This may provide benefit to users who may prefer to generate an electronic document at a later point in time or using a different computing device than the one they may be currently working with.

Moreover, the machine learning modeling 108 may be continuously adapted as new electronic documents (and associated signal data) are generated. For instance, a user may create a new type of electronic document where additional versions of that document may be subsequently re-created numerous times. As such, personalized content suggestions can be directed to such content to differentiate from traditional pre-canned suggestions for template creation. Pre-canned suggestions for template create may be surfaced in addition to the personalized content suggestions. In some instances, a larger amount of pre-canned suggestions may be presented when the user account first utilizes applications/services and processing of the present disclosure evolves those pre-canned suggestions into highly personalized content suggestions as the user interacts more with applications/services.

Processing operations of the content personalization component 106 may be written into the coding of an application/service, where an application/service may be adapted to implement functionality described in the present disclosure. In another example, processing by the content personalization component 106 may be may be executed by a stand-alone application/service that is configured to interface with the application/service component 104 to provide customized application experiences. For example, an application/service for management of personalized content suggestions may interface with an application platform providing a suite of productivity applications/services, where personalized content suggestions can be tailored to the specific types of electronic documents that individual applications/services are programmed to work with. In one non-limiting implementation example of a stand-alone application/service for personalized content management, the content personalization component 106 may be configured as a component of a microservice that can be reused by different applications/services and adapted to application-specific scenarios. In such an example, an example micro-service may interface with other applications/service through an application programming interface (API). The microservice provides a lightweight service-oriented architecture that enables content suggestion management to be developed, deployed and scaled across different types of applications/services. Implementation of a microservice is known to one skilled in the field of art, where operation of an example microservice may be adapted to provide functionality as described in the present disclosure.

FIG. 2 illustrates an exemplary method 200 related to provision of personalized content suggestions, with which aspects of the present disclosure may be practiced. Processing operations described in method 200 may be executed by components described in process flow 100 (FIG. 1), where the detailed description in process flow 100 supports and supplements the recited processing operations in method 200. Interfacing and communication between exemplary components, such as those described in process flow 100, are known to one skilled in the field of art. For example, data requests and responses may be transmitted between applications/services to enable specific applications/services to process data retrieved from other applications/services. Formatting for such communication may vary according to programmed protocols implemented by developers without departing from the spirit of this disclosure.

As an example, method 200 may be executed across an exemplary computing system (or computing systems) as described in the description of FIG. 3. Exemplary components, described in method 200, may be hardware and/or software components, which are programmed to execute processing operations described herein. Operations performed in method 200 may correspond to operations executed by a system and/or service that execute computer programs, software agents, intelligent bots, application programming interfaces (APIs), neural networks and/or machine-learning processing, among other examples. In some examples, processing operations described in method 200 may be executed by one or more applications/services associated with a web service that has access to a plurality of application/services, devices, knowledge resources, etc. In one instance, processing operations described in method 200 may be implemented by one or more components connected over a distributed network.

Method 200 begins at processing operation 202, where a request for document creation is received. As described in the description of process flow 100 (FIG. 1), a user may make a request for document creation through a user interface of an application/service such as a productivity application or service. While method 200 describes examples where the user is making an explicit request to create an electronic document (e.g., through template creation via an application/service), it is to be understood that examples for generation of personalized content suggestions extend to those in which personalized content suggestions are predictively generated on behalf of a user as described in the description of process flow 100. In any example, signal data may be collected in real-time (or near real-time) for determining a user intent for document creation or predictive user intent for a next type of document that a user may wish to create. Types of signal data as well as collection and processing of signal data have been described in the foregoing description including the description of process flow 100 (FIG. 1).

Processing operation 202 may comprise receiving a selection of a document type for document creation. For instance, a user interface of an application/service may be configured to enable a user to select a document type or a template for document creation, which may be a trigger for receipt of a request for document creation. Example document types may vary based on the application/service that is being executed. Different document types are known to one skilled in the field of art, where the present disclosure is applicable to any type of document type. Moreover, a receipt (processing operation 202) of a request for document creation may further comprise receiving additional user input (e.g., textual input, spoken utterances) that may provide additional context indicating user intent for document creations. For instance, the user interface of an application/service or another application/service, executing on a computing device, may be configured to receive data input such as a title for document creation, keywords, topics of interests, section and/or sub-section identification, and slide presentation identification, among other examples. Such data may be useful for generation of personalized content suggestions, for example, matching data from previously created electronic documents to a user intent for document creation.

Flow of method 200 may proceed to processing operation 204, where signal data associated with a received request is evaluated. Types of signal data as well as collection and evaluation of signal data have been described in the foregoing description including the description of process flow 100 (FIG. 1). As an example, evaluation of signal data comprises identifying a document type for document creation; received input accompanying a document creation request and a user account associated with the request. Additional user account signal data may further be evaluated to identify associations of a user, groups, teams, channels, organizations, social network connections, etc., to assist with identification of previously created documents in a users' network. Such evaluation may be useful for a machine learning modeling to match relevant previously created documents to a user's intent for document creation.

Signal data and results from signal data evaluation may be propagated for machine learning modeling. At processing operation 206, document-specific analytics are executed to evaluate previously creation electronic documents that may be relevant to a current context of the user. For example, a content personalization component (e.g., content personalization component 106) may be configured to execute document-specific analytics for generation of personalized content suggestions. Examples of personalized content suggestions as well as processing for evaluation of signal data and generation of personalized content suggestions have been provided in the foregoing description including process flow 100 (FIG. 1). Document-specific analytics as well as previously created electronic documents have been described in the foregoing description. In one example, document-specific analytics are executed by a microservice configured for generation of personalized content suggestions.

Processing operation 206 may comprise execution of processing operations that comprise but are not limited to: identifying a previously created document, created by the user account, that matches the identified document type; evaluating data and metadata associated with the previously created document; and identifying one or more topics based on the evaluation of the data and metadata associated with the previously created document. Identified topics may be utilized for generation of personalized content suggestions.

Flow of method 200 may proceed to processing operation 208, where personalized content suggestions are generated. Processing operation 208 comprises personalizing content suggestions for the user account based on results from execution of the document-specific analytics. In one example, personalized content suggestions may be generated, for a user, based on a document type that the user is working with (e.g., document type associated with a request for document creation). Processing operation 208 may further comprise execution of operations including but not limited to: ranking content suggestions based on the results from the execution of the document-specific analytics; and selecting one or more of the ranked content suggestions for the personalized content suggestions that are output through an application/service (e.g., a productivity application/service).

Once personalized content suggestions have been generated, flow of method 200 proceeds to processing operation 210, where the personalized content suggestions are presented. In one example, one or more of the personalized content suggestions are presented through a user interface of an application/service (e.g., productivity application/service). For instance, a user account may make a request for document creation, where personalized content suggestions may be presented to the user to assist with document creation processing. In another example, one or more personalized content suggestions may be presented through another modality (e.g., other than an application/service by which a user made a request for document creation). Non-limiting examples of other modalities comprise but are not limited to: email, messaging, instant messaging, via a social network, notification, and feed, among other examples. In some examples, processing operation 210 comprises presenting personalized content suggestions in addition to pre-canned design suggestions for template generation or any other pre-canned suggestion for template generation.

Flow of method 200 may proceed to decision operation 212, where it is determined whether a selection of a personalized content suggestion is made. In examples where a user ignores the personalized content suggestions and no selection is made, flow of decision operation 212 branches NO and processing of method 200 remains idle until another request for document creation is initiated. In examples where a selection of one or more of the personalized content suggestions is made, flow of decision operation 212 branches YES and processing of method 200 proceeds.

In some examples, flow of method 200 proceeds to processing operation 214. At processing operation 214, a preview of an electronic document is generated for the user, where the preview comprises the one or more personalized content suggestions selected by the user. A non-limiting example of a preview of an electronic document is illustrated in FIG. 3F.

In any example, flow of method 200 proceeds to processing operation 216, where an electronic document is generated and presented to the user. Processing operation 216 comprises presenting the electronic document to a user via a user interface of an application/service (e.g., productivity application/service). An example electronic document, that is generated and presented through a user interface, comprises the personalized content suggestions.

In some alternative examples of method 200, a version of an electronic document may be automatically generated on behalf of a user. In such examples, a service for generating and surfacing personalized content suggestions may automatically generate personalized content suggestions on behalf of the user and present the personalized content suggestions in a version of an electronic document. This may occur in instances where document-specific analytics predictively indicate, with a high likelihood (e.g., via a threshold determination) that specific content may be relevant to a user in a specific manner of presentation.

FIGS. 3A-3F illustrate exemplary processing device views associated with provision of personalized content suggestions through a user interface, with which aspects of the present disclosure may be practiced. Processing operations described in process flow 100 (FIG. 1) and method 200 (FIG. 2) support and supplement back-end processing used for generation of exemplary processing device views shown in FIGS. 3A-3E.

FIG. 3A illustrates processing device view 300, illustrating an interaction with a user, through a user computing device, and an exemplary productivity service. Processing device view 300 illustrates display of an adapted user interface that presents a non-limiting example of a user interface screen 302 fostering creation of customized templates usable for document creation. User interface screen 302 may be one of many user interface screens usable to guide a user through creation of a customized template through an application/service (e.g., productivity application/service). In the example shown, a user may provide input selecting a newsletter 304 as a document type for creation of a specific type of electronic document.

FIG. 3B illustrates processing device view 310, illustrating another example of an interaction with a user, through a user computing device, and an exemplary productivity service. In one instance, processing device 310 is a continued example, from processing device view 300 (FIG. 3A), where user interface screen 312 is a subsequent displayed user interface feature based on selection of a document type for document creation (e.g., user interface screen 302 of FIG. 3A). User interface screen 312 provides a data entry prompt for a user to enter input into input field 314 associated with customization of a template for generation of an electronic document. In the continued example from processing device view 300 where a user selects a newsletter as a document type for document creation, user interface screen 312 is configured to provide a user with an input field 314, where the user has the ability to title their newsletter. This may provide additional signal data for a content personalization component (e.g., content personalization component 106 of FIG. 1) to generate personalized content suggestions. As an example, a user may regularly create a school newsletter for an elementary school titled "School Dayz". Processing operations described herein may utilize this type of input to identify previously created electronic documents (e.g., prior versions of school newsletters) that may provide useful content for a user to create a new newsletter document. A user interface may be adapted to enable other types of input for template customization including those types of data identified in the foregoing description such as keywords, topics, sections, etc.

Figure 3C:
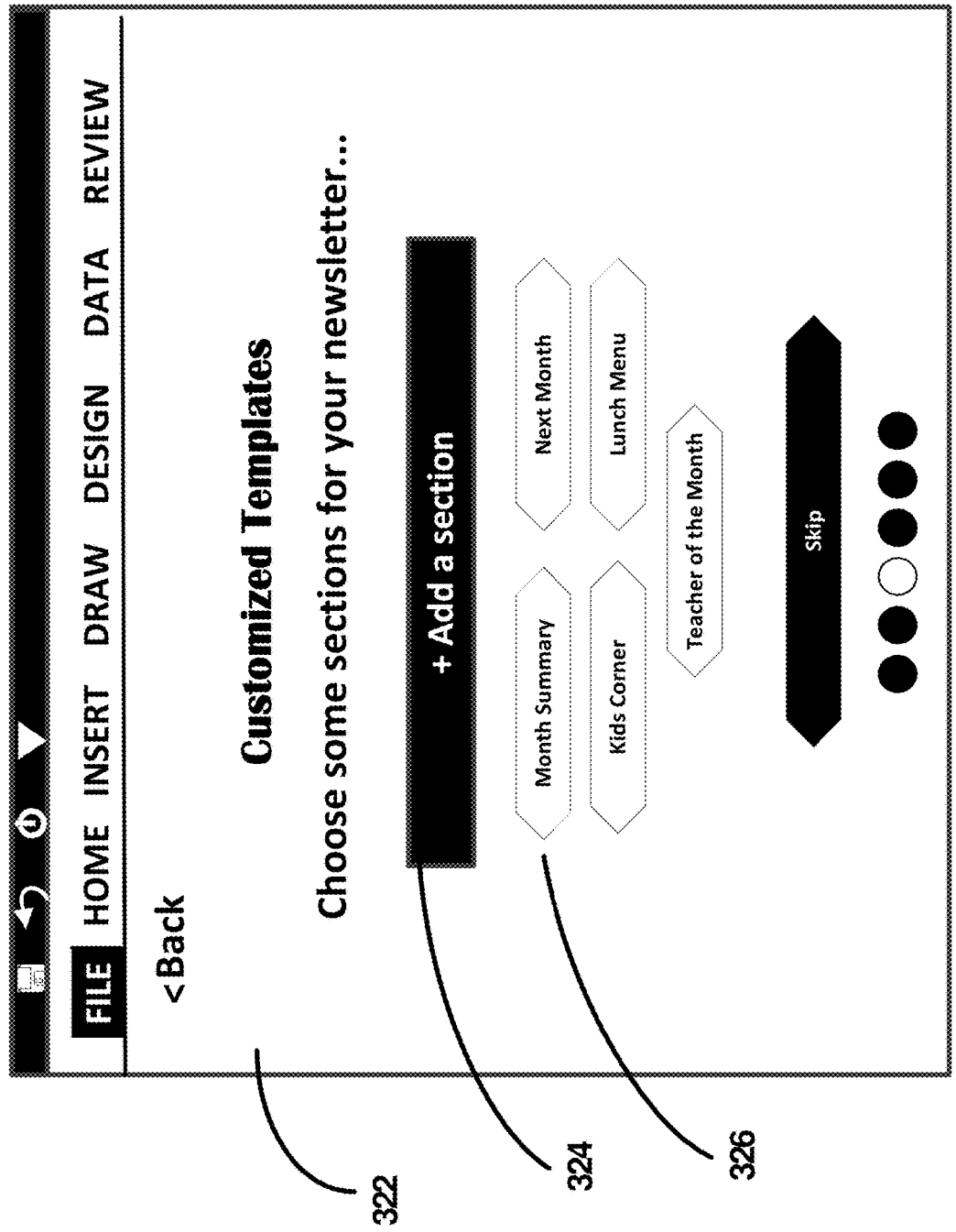

FIG. 3C illustrates processing device view 320, illustrating another example of an interaction with a user, through a user computing device, and an exemplary productivity service. In one instance, processing device 320 is a continued example, from processing device views 300 (FIG. 3A) and 310 (FIG. 3B), where user interface screen 322 is a subsequent displayed user interface feature based on selection of a document type for document creation. In the example shown, user interface screen 322 provides display of personalized content suggestions 326 for the user to choose from to assist with document creation. Continuing with the previous example where a school newsletter is being created, the personalized content suggestions 326 provide sections that may be personalized for the user. In further examples, a user interface may be adapted to provide a user interface features 325 enabling a user to add its own specific sections for document creation. User-created document content (e.g., sections) may be usable as personalized content suggestions for subsequent document creation of a specific document type (e.g., newsletter) by that specific user or other affiliated users. In some examples, user creation of document content may trigger an update to a listing of personalized content suggestions, where direct user input may add further context for creation of its electronic document.

FIG. 3D illustrates processing device view 330, illustrating another example of an interaction with a user, through a user computing device, and an exemplary productivity service. In one instance, processing device 330 is a continued example, from processing device views 300 (FIG. 3A) and 310 (FIG. 3B) and 320 (FIG. 3C), where user interface screen 322 is a subsequent displayed user interface feature based on selection of a document type for document creation. Processing device view 330 illustrates additional user interface features that provide an improved user interface for a user. For instance, a user may execute an action 332 such as scrolling over a personalized content suggestion 326 or selecting a personalized content suggestion 326, where a user interface callout 334 is presented, through the user interface, on behalf of the user. The user interface callout 334 provides context identifying why a specific personalized content suggestion is recommended. In the example shown, a personalized content suggestion for a section "teacher of the month" was recommended because the section was recently added to the last version of the school newsletter.

Figure 3E:
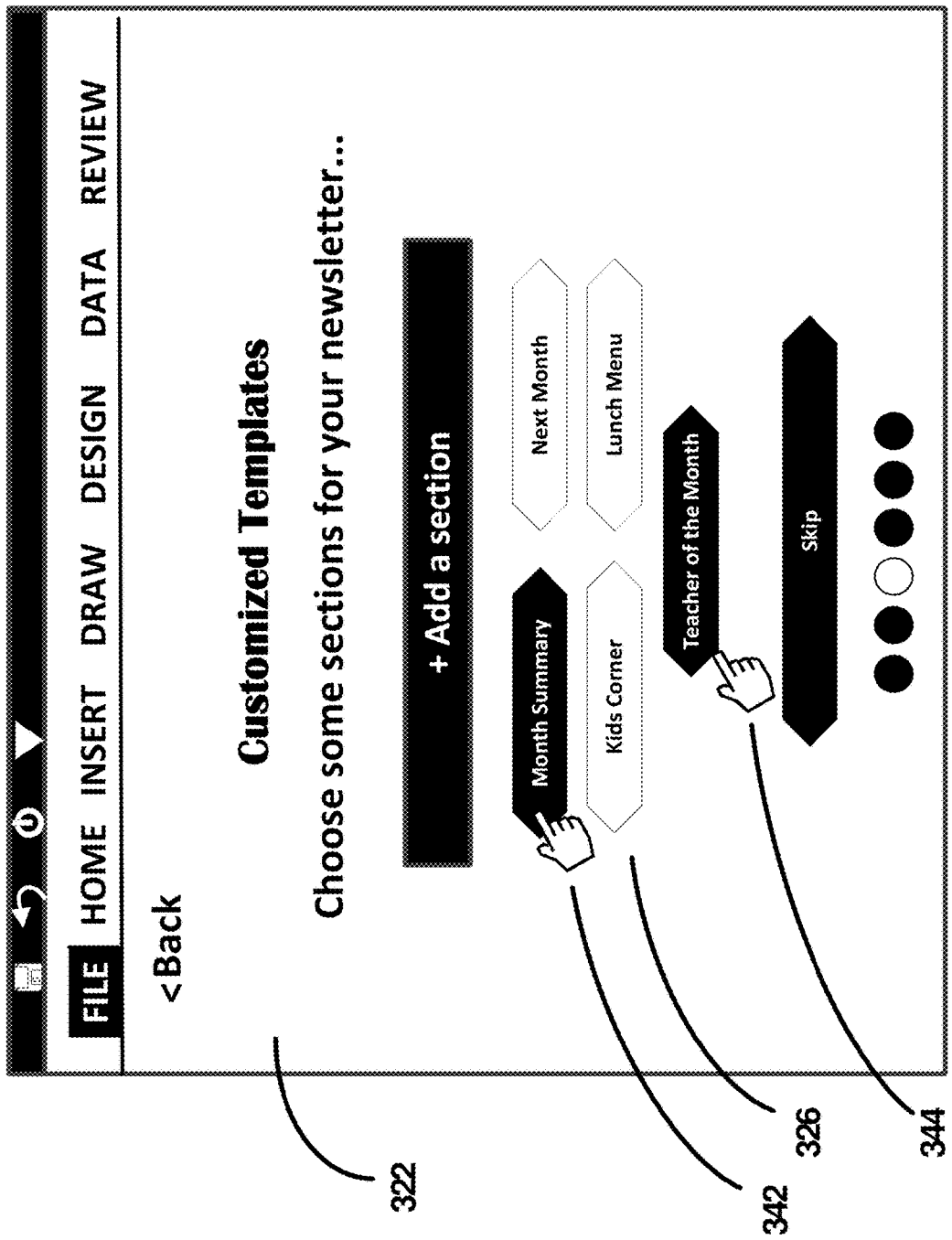

FIG. 3E illustrates processing device view 340, illustrating another example of an interaction with a user, through a user computing device, and an exemplary productivity service. In one instance, processing device 340 is a continued example, from processing device views 300 (FIG. 3A) and 310 (FIG. 3B) and 320 (FIG. 3C), where user interface screen 322 is a subsequent displayed user interface feature based on selection of a document type for document creation. Processing device view 340 illustrates additional user interface features that enable a user to select specific personalized content suggestions 326 for generation of an electronic document. In the example shown, a user makes a first selection 342 selecting a "month summary" section for addition to its document (e.g., school newsletter). The user makes a second selection 344, selecting a "teacher of the month" section for addition to its document (e.g., school newsletter).

FIG. 3F illustrates processing device view 350, illustrating another example of an interaction with a user, through a user computing device, and an exemplary productivity service. In one instance, processing device 350 is a continued example, from processing device views 300 (FIG. 3A) and 310 (FIG. 3B), 320 (FIG. 3C) and 340 (FIG. 3E), where user interface screen 322 is a subsequent displayed user interface feature based on selection of a document type for document creation and selection of personalized content suggestions. Processing device view 350 illustrates user interface screen 352, providing a document preview 354 of an electronic document based on the previous user selections. In a continued example where a document type is a newsletter, document preview 354 provides a preview of an electronic document for a school newsletter (e.g., "School Dayz"). Document preview 354 comprises content portions for the personalized content suggestions 326 that were selected by the user. A first content portion 356 corresponds to the first selection 342 (FIG. 3E) made by the user and a second content portion 358 corresponds to a second selection 344 (FIG. 3E) made by the user. The user interface screen 352 may further be configured to provide a user interface features 360 for generation of an electronic document. For instance, an electronic document may be generated based on the document preview 354 presented in processing device view 350. As referenced in the foregoing description, electronic documents may be generated without requiring a document preview. However, this may be extremely useful for a user to see how content portions may appear in a generated electronic document before the document is generated and edited. In any example, an electronic document may be generated and presented for a user (e.g., via a user interface of an application/service).

Figure 4:
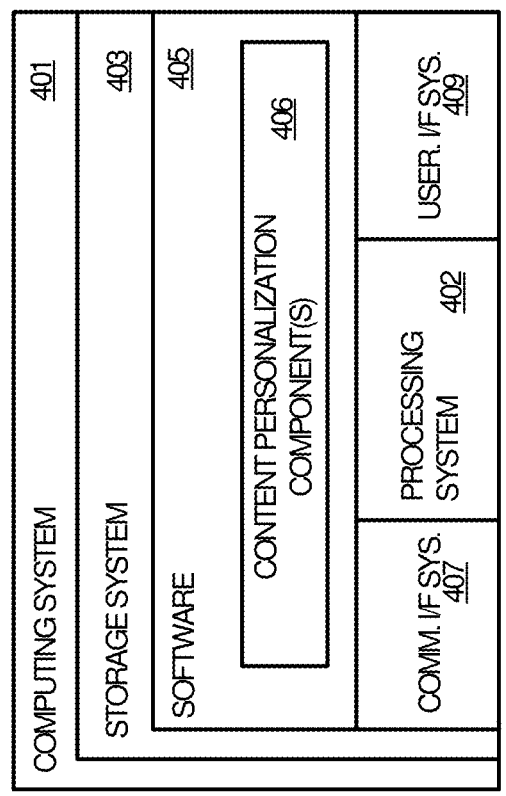
FIG. 4 illustrates a computing system suitable for implementing processing operations described herein related to presentation of personalized content suggestions, with which aspects of the present disclosure may be practiced.

FIG. 4 illustrates a computing system 401 suitable for implementing processing operations described herein related to presentation of personalized content suggestions, with which aspects of the present disclosure may be practiced. Computing system 401, which is representative of any system or collection of systems in which the various applications, services, scenarios, and processes disclosed herein may be implemented. Examples of computing system 401 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, portable electronic devices, smart televisions, smart watches and other wearable devices, as well as any variation or combination thereof.

Computing system 401 may be implemented as a single apparatus, system, or device or may be implemented in a distributed manner as multiple apparatuses, systems, or devices. For example, computing system 401 may comprise one or more computing devices that execute processing for applications and/or services over a distributed network to enable execution of processing operations described herein over one or more services. Computing system 401 may comprise a collection of devices executing processing for front-end applications/services, back-end applications/service or a combination thereof. Computing system 401 comprises, but is not limited to, processing system 402, storage system 403, software 405, communication interface system 407, and user interface system 409. Processing system 402 is operatively coupled with storage system 403, communication interface system 407, and user interface system 409. Processing system 402 loads and executes software 405 from storage system 403. Software 405 includes one or more software components that are configured as content personalization components 406 executing processing operations as described herein. In some examples, computing system 401 may be a device that a user utilizes to access an application/service in which personalized content suggestions are surfaced. For instance, processing operations for personalized content suggestion processing may be executed through a microservice that is either executing on computing system 401 or accessed over network connection by computing system 401. When executed by processing system 402, software 405 directs processing system 402 to operate as described herein for at least the various processes, operational scenarios, and sequences discussed in the foregoing implementations. Computing system 401 may optionally include additional devices, features, or functionality not discussed for purposes of brevity.

Referring still to FIG. 4, processing system 402 may comprise processor, a micro-processor and other circuitry that retrieves and executes software 405 from storage system 403. Processing system 402 may be implemented within a single processing device but may also be distributed across multiple processing devices or sub-systems that cooperate in executing program instructions. Examples of processing system 402 include general purpose central processing units, graphical processing units, application specific processors, and logic devices, as well as any other type of processing device, combinations, or variations thereof.

Storage system 403 may comprise any computer readable storage media readable by processing system 402 and capable of storing software 405. Storage system 403 may include volatile and nonvolatile, removable and non-removable media implemented in any method or technology for storage of information, such as computer readable instructions, data structures, program modules, cache memory or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer readable storage media a propagated signal.

In addition to computer readable storage media, in some implementations storage system 403 may also include computer readable communication media over which at least some of software 405 may be communicated internally or externally. Storage system 403 may be implemented as a single storage device but may also be implemented across multiple storage devices or sub-systems co-located or distributed relative to each other. Storage system 403 may comprise additional elements, such as a controller, capable of communicating with processing system 402 or possibly other systems.

Software 405 may be implemented in program instructions and among other functions may, when executed by processing system 402, direct processing system 402 to operate as described with respect to the various operational scenarios, sequences, and processes illustrated herein. For example, software 405 may include program instructions for implementing content personalization components 406 and/or other applications/services of an application platform, as described in the foregoing description.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 405 may include additional processes, programs, or components, such as operating system software, virtual machine software, or other application software. Software 405 may also comprise firmware or some other form of machine-readable processing instructions executable by processing system 402.

In general, software 405 may, when loaded into processing system 402 and executed, transform a suitable apparatus, system, or device (of which computing system 401 is representative) overall from a general-purpose computing system into a special-purpose computing system customized to process data and respond to queries. Indeed, encoding software 405 on storage system 403 may transform the physical structure of storage system 403. The specific transformation of the physical structure may depend on various factors in different implementations of this description. Examples of such factors may include, but are not limited to, the technology used to implement the storage media of storage system 403 and whether the computer-storage media are characterized as primary or secondary storage, as well as other factors.

For example, if the computer readable storage media are implemented as semiconductor-based memory, software 405 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 407 may include communication connections and devices that allow for communication with other computing systems (not shown) over communication networks (not shown). Communication interface system 407 may also be utilized to cover interfacing between processing components described herein. Examples of connections and devices that together allow for inter-system communication may include network interface cards or devices, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 409 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 409. In some cases, the input and output devices may be combined in a single device, such as a display capable of displaying images and receiving touch gestures. The aforementioned user input and output devices are well known in the art and need not be discussed at length here.

User interface system 409 may also include associated user interface software executable by processing system 402 in support of the various user input and output devices discussed above. Separately or in conjunction with each other and other hardware and software elements, the user interface software and user interface devices may support a graphical user interface, a natural user interface, or any other type of user interface, for example, that enables front-end processing of exemplary application/services described herein (including productivity applications/services).

Communication between computing system 401 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A computer-implemented method comprising:
receiving, through a user interface of a productivity application or service, a request for template creation that comprises an identification of a template type for creation of a template;
evaluating signal data associated with the request, wherein an evaluation of the signal data comprises identifying the template type and a specific user account associated with the request;
generating a personalized content suggestion for inclusion in the template by applying a trained machine learning model that is configured to generate the personalized content suggestion based on an evaluation of content from one or more previously created documents that were created by the specific user account and have a document type matching the template, wherein the trained machine learning model executes processing operations that comprise:
determining a user intent based on the signal data associated with the request and past usage patterns of the specific user account accessing the productivity application or service,
identifying a set of previously created documents that were created by the specific user account and have the document type matching the template,
identifying one previously created document from the set of previously created documents based on correlating the one previously created document and the user intent, and
generating the personalized content suggestion based on analysis of content of the one previously created document; and
presenting, through the user interface, the personalized content suggestion in a surfaced representation of the template.

2. The computer-implemented method of claim 1, wherein identifying the set of previously created documents comprises:
filtering, from stored documents, the set of previously created documents based on the set of previously created documents having the document type matching the template.

3. The computer-implemented method of claim 2, wherein the filtering of the set of previously created documents occurs further based on a result of relevance ranking, generated by the trained machine learning model.

4. The computer-implemented method of claim 1, further comprising:
receiving, through the user interface, a selection of the personalized content suggestion; and
generating an electronic document that comprises one or more content portions associated with the selected personalized content selection.

5. The computer-implemented method of claim 1, wherein the trained machine learning model, in generating the personalized content suggestion, executes processing operations that comprise:
generating a user-specific relevance ranking of content portions of the one previously created document based on analysis of user-specific signal data that comprises signal data indicating usage patterns of a specific content portion of the one previously created document; and
wherein the presenting of the personalized content suggestion comprises selecting, from a plurality of personalized content suggestions, the personalized content suggestion based on a result of analyzing the user-specific relevance ranking.

6. The computer-implemented method of claim 1, wherein the trained machine learning model, in generating the personalized content suggestion, executes processing operations that comprise:
generating a user-specific relevance ranking of content portions of the one previously created document based on analysis of user-specific signal data that comprises signal data indicating user actions associated with specific content portions of the one previously created document; and wherein the presenting of the personalized content suggestion comprises selecting, from a plurality of personalized content suggestions, the personalized content suggestion based on a result of analyzing the user-specific relevance ranking.

7. The computer-implemented method of claim 1, further comprising:

receiving a scroll over or a selection of the personalized content suggestion on the user interface; and presenting, based on the scroll over or the selection of the personalized content suggestion, a user interface callout comprising context identifying why the personalized content suggestion was presented.

8. The computer-implemented method of claim 7, wherein the context identifying why the personalized content suggestion was presented comprises an indication that a section in the one previously created document corresponding to the personalized content suggestion was recently added to the one previously created document.

9. A system comprising:

at least one processor; and a memory, operatively connected with the at least one processor, storing computer-executable instructions that, when executed by the at least one processor, causes the at least one processor to execute a method that comprises:

receiving, through a user interface of a productivity application or service, a request for template creation that comprises an identification of a template type for creation of a template;

evaluating signal data associated with the request, wherein an evaluation of the signal data comprises identifying the template type and a specific user account associated with the request;

generating a personalized content suggestion for inclusion in the template by applying a trained machine learning model that is configured to generate the personalized content suggestion based on an evaluation of content from one or more previously created documents that were created by the specific user account and have a document type matching the template, wherein the trained machine learning model executes processing operations that comprise:

determining a user intent based on the signal data associated with the request and past usage patterns of the specific user account accessing the productivity application or service, identifying a set of previously created documents that were created by the specific user account and have the document type matching the template, identifying one previously created document from the set of previously created documents based on correlating the one previously created document and the user intent, and generating the personalized content suggestion based on analysis of content of the one previously created document; and presenting, through the user interface, the personalized content suggestion in a surfaced representation of the template.

10. The system of claim 9, wherein the identifying of the set of previously created documents further comprises:

filtering, from stored documents, the set of previously created documents based on the set of previously created documents having the document type matching the template.

11. The system of claim 10, wherein the identifying of the set of previously created documents further comprises:

generating a relevance ranking of the set of previously created documents by the trained machine learning model.

12. The system of claim 9, wherein the method, executed by the at least one processor, further comprises:

receiving, through the user interface, a selection of the personalized content suggestion; and generating an electronic document that comprises one or more content portions associated with the selected personalized content selection.

13. The system of claim 9, wherein generating the personalized content suggestion by the trained machine learning model further comprises:

generating a user-specific relevance ranking of content portions of the one previously created document based on analysis of user-specific data that comprises signal data indicating usage patterns of a specific content portion of the one previously created document; and wherein the presenting of the personalized content suggestion comprises selecting, from a plurality of personalized content suggestions, the personalized content suggestion based on a result of analyzing the user-specific relevance ranking.

14. The system of claim 9, wherein generating the personalized content suggestion by the trained machine learning model further comprises:

generating a user-specific relevance ranking of content portions of the one previously created document based on analysis of user-specific signal data that comprises signal data indicating user actions associated with specific content portions of the one previously created document; and wherein the presenting of the personalized content suggestion comprises selecting, from a plurality of personalized content suggestions, the personalized content suggestion based on a result of analyzing the user-specific relevance ranking.

15. The system of claim 9, wherein the method, executed by the at least one processor, further comprises:

receiving a scroll over or a selection of the personalized content suggestion on the user interface; and presenting, based on the scroll over or the selection of the personalized content suggestion, a user interface callout comprising context identifying why the personalized content suggestion was presented.

16. The system of claim 15, wherein the context identifying why the personalized content suggestion was presented comprises an indication that a section in the one previously created document corresponding to the personalized content suggestion was recently added to the one previously created document.

17. A computer-readable storage media storing computer-executable instructions that, when executed by at least one processor, causes the at least one processor to execute a method comprising:

receiving, through a user interface of a productivity application or service, a request for template creation that comprises an identification of a template type for creation of a template;

evaluating signal data associated with the request, wherein an evaluation of the signal data comprises identifying the template type and a specific user account associated with the request;

generating a personalized content suggestion for inclusion in the template by applying a trained machine learning model that is configured to generate the personalized content suggestion based on an evaluation of content from one or more previously created documents that were created by the specific user account and have a document type matching the template, wherein the trained machine learning model executes processing operations that comprise:

determining a user intent based on the signal data associated with the request and past usage patterns of the specific user account accessing the productivity application or service, identifying a set of previously created documents that were created by the specific user account and have the document type matching the template, identifying one previously created document from the set of previously created documents based on correlating the one previously created document and the user intent, and generating the personalized content suggestion based on analysis of content of the one previously created document; and presenting, through the user interface, the personalized content suggestion in a surfaced representation of the template.

18. The computer-readable storage media of claim 17, wherein the method, executed by the at least one processor, further comprises:

receiving, through the user interface, a selection of the personalized content suggestion; and generating an electronic document that comprises one or more content portions associated with the selected personalized content selection.

19. The computer-readable storage media of claim 17, wherein the method, executed by the at least one processor, further comprises:

receiving a scroll over or a selection of the personalized content suggestion on the user interface; and presenting, based on the scroll over or the selection of the personalized content suggestion, a user interface call-out comprising context identifying why the personalized content suggestion was presented.

20. The computer-readable storage media of claim 19, wherein the context identifying why the personalized content suggestion was presented comprises an indication that a section in the one previously created document corresponding to the personalized content suggestion was recently added to the one previously created document.

* * * * *